United States Patent
Wang et al.

(10) Patent No.: US 8,154,831 B2
(45) Date of Patent: Apr. 10, 2012

(54) LEAKAGE CURRENT DETECTION INTERRUPTER WITH FIRE PROTECTION MEANS

(75) Inventors: Fu Wang, Zhejiang (CN); Xiangfa Ye, Zhejiang (CN); Yong Dai, Zhejiang (CN); Xiaoyong Li, Zhejiang (CN)

(73) Assignee: General Protecht Group, Inc., Yueqing, Zhejiang (CN)

( * ) Notice: Subject to any disclaimer, the term of this patent is extended or adjusted under 35 U.S.C. 154(b) by 266 days.

(21) Appl. No.: 12/606,405

(22) Filed: Oct. 27, 2009

(65) Prior Publication Data

US 2010/0046128 A1    Feb. 25, 2010

Related U.S. Application Data

(63) Continuation-in-part of application No. 11/588,044, filed on Oct. 26, 2006, now Pat. No. 7,889,464.

(30) Foreign Application Priority Data

Dec. 23, 2005    (CN) .......................... 2005 1 0132613

(51) Int. Cl.
    *H02H 3/04*       (2006.01)
(52) U.S. Cl. ....................................................... 361/42
(58) Field of Classification Search ...................... 361/42
See application file for complete search history.

(56) References Cited

U.S. PATENT DOCUMENTS

| 7,136,266 | B2* | 11/2006 | Gershen et al. ................ 361/42 |
| 2002/0003686 | A1* | 1/2002 | Disalvo ........................... 361/42 |
| 2004/0228048 | A1* | 11/2004 | Aromin ............................. 361/2 |
| 2006/0061924 | A1* | 3/2006 | Zhang ............................. 361/42 |
| 2006/0146456 | A1* | 7/2006 | Williams ........................ 361/42 |
| 2010/0020452 | A1* | 1/2010 | Gandolfi ........................ 361/42 |

* cited by examiner

*Primary Examiner* — Jared Fureman
*Assistant Examiner* — Nicholas Ieva
(74) *Attorney, Agent, or Firm* — Morris Manning & Martin LLP; Tim Tingkang Xia, Esq.

(57) ABSTRACT

A leakage current detection interrupter with fire protection means comprising: (i) a movable assembly housing; (ii) two fixed contact holders each having a fixed contact point; (iii)) two movable contact holders each having a fixed end and a movable end with a movable contact point; (iv) a movable assembly that moves between a first position and a second position; (v) a resetting component; (vi) a resetting component spring; (vii) an electromagnetic tripping component, which, when energized, which is responsive to a fault condition, causes the movable assembly to be in the second position from the first position; (viii) an leakage current protection circuit assembled on a printed circuit board for detecting the fault condition; and (ix) a set of three electrical wires: a first wire, a second wire, and a third wire to an appliance, wherein the first wire and the second wire are protected by a plurality of protective shields.

14 Claims, 7 Drawing Sheets

LEAKAGE CURRENT DETECTION INTERRUPTER WITH FIRE PROTECTION MEANS

CROSS-REFERENCE TO RELATED APPLICATION

This application is a continuation-in-part of the U.S. patent application Ser. No. 11/588,044, filed Oct. 26, 2006, entitled "A Leakage Current Detection Interrupter with Fire Protection Means", by Wusheng CHEN, Fu WANG, Yong DAI, Xiaoyong LI, and Huaiyin SONG, which itself claims priority of Chinese Patent Application No. 200510132613.1, filed Dec. 23, 2005, entitled "A Leakage Current Detection Interrupter with Fire Protection Means" by Wusheng CHEN, Fu WANG, Yong DAI, Xiaoyong LI, and Huaiyin SONG, the disclosures of which are incorporated herein by reference in its entireties.

FIELD OF THE PRESENT INVENTION

The present invention generally relates to real time detection of fault of a leakage current protection device for appliances. More particularly, the present invention relates to a leakage current detection interrupter with fire protection means.

BACKGROUND OF THE PRESENT INVENTION

As the awareness of product safety and demands for higher performance and safer appliances, electrical/electronic products, manufacturer of various appliances, power suppliers, power connectors, and wall outlets are looking for new ways to improve the safety of these products. Products such as surge protectors, leakage current detection interrupters (herein after "LCDI"), and ground fault circuit interrupters (hereinafter after "GFCI") are only a few examples. These products protect against current-surge protection, voltage-surge protection, leakage current protection and ground fault protection. However, they share a common deficiency: protection against wire breakage and/or fire protection. From time to time, power cords are broken/damaged by small animals such as rats or by accidental cuts during house renovation. For appliances demanding large current such as electrical stove, electrical dryer, or air condition units, fire hazard is a great concern to their users. In case of emergency such as fire or explosion, a safety device with power cord/power connector that can prevent damages during these situations is greatly needed. Such safety device is able to detect the emergency such as fire and/or explosion, to cut off the electrical power from its source, to sustain the fire and/or explosion and to prevent further damages.

Therefore, a heretofore unaddressed need exists in the art to address the aforementioned deficiencies and inadequacies.

SUMMARY OF THE PRESENT INVENTION

In one aspect, the present invention relates to a leakage current detection interrupter. The leakage current detection interrupter has: (i) a movable assembly housing which has a first side surface and an opposite, second side surface, and a body defined therebetween, and the body defines two vertical openings on the first side surface and the second surface; (ii) a first fixed contact holder having a first fixed contact point, and a second fixed contact holder having a second fixed contact point; (iii) a first movable contact holder and a second movable contact holder, each having a fixed end attached to the movable assembly housing and a movable end, where the first movable end has a first movable contact arranged for contacting the first fixed contact, the second movable end has a second movable contact arranged for contacting the second fixed contact; (iv) a movable assembly that moves between a first position in which each fixed contact makes contact with the respective movable contact and a second position in which the fixed contacts are separated from the movable contacts; (v) a resetting component having a first end accessible to a user for resetting the leakage current detection interrupter and a second end with a tapered tip and a notch, which, when the movable assembly is in the first position, is engaged with the movable assembly; (vi) a resetting component spring which is used to bias the resetting component so as to disengage the movable assembly; (vii) an electromagnetic tripping component, which, when energized, which is responsive to a fault condition, causes the movable assembly to be in the second position from the first position, thereby causing the resetting component to disengage the movable assembly; (viii) an leakage current protection circuit assembled on a printed circuit board for detecting the fault condition, wherein the leakage current protection circuit comprises a first input LI-L, a second input LI-N, a third input LI-G, a first out put LO-P, a second output LO-N and a third output LO-G, wherein the leakage current protection circuit is capable of detecting a fault condition and energizing the electromagnetic tripping component to cause resetting component to disengage the movable assembly in responsive to the fault condition; and (ix) a set of three electrical wires to an appliance, wherein a first wire connects the first input LI-L to the first output LO-P, a second wire connects the second input LI-N to the second output LO-N, and a third wire connects the third input LI-G to the third output LO-G of the leakage current detection interrupter, and wherein the first wire and the second wire are protected by a plurality of protective shields.

In one embodiment, the fault condition includes a condition when a leakage current is detected and a condition when a ground fault is detected.

In one embodiment, the leakage current protection circuit has (i) a first switch K1 having a first terminal connected the first input LI-L, and a second terminal connected to the first output LO-P, for opening and closing the connection between the first input LI-L and the first output LO-P, (ii) a second switch K2 having a first terminal connected the second input LI-N, and a second terminal connected to the second output LO-N, for opening and closing the connection between the second input LI-N and the second output LO-N, (iii) an trip coil J1 having a first terminal connected to the first output LO-P and a second terminal, where the trip coil J1 simultaneously controls the opening and closing of the first switch K1 and the second switch K2, (iv) an leakage current detection unit having a metal oxide varistor MOV with a first terminal and a second terminal, wherein the first terminal of the MOV is electrically coupled to the first input LI-I and the second terminal of the MOV is electrically coupled to the second input LI-N, (v) a current interrupter having a relay that has a first terminal and a second terminal, and a first resistor R1 with a first terminal and a second terminal, connected in serial such that the first terminal of the first resistor R1 is electrically coupled to the second terminal of the relay, wherein the leakage current detection unit detects a fault condition, causing a current passing through the relay, which connects the circuit of the trip coil J1 the both input lines LI-L and LI-N to activate the trip coil J1 and causes the first switch K1 and the second switch K2 to open the circuit simultaneously, and (vi) a circuit condition indicator circuit having a light emit diode LED with an anode and a cathode and a second resistor R2 with a first terminal and a second terminal, wherein the anode of the LED is electrically coupled to the second output LO-N, the cathode of the LED is electrically coupled to the first terminal of the second resistor R2, and the second terminal of the second resistor R2 is electrically coupled to the first output LO-P, wherein when the leakage current detection interrupter is in normal working condition, the LED is lit, and when the leakage current detection interrupter detects a leakage current, the LED is off.

In one embodiment, the leakage current detection unit has a first diode D1 and a second diode D2. Both D1 and D2 have an anode and a cathode. The anode of the first diode D1 is electrically coupled to the first input LI-L, and the cathode of the first diode D1 is electrically coupled to the first terminal of the relay. The anode of the second diode D2 is electrically coupled to the second input LI-N, and the cathode of the second diode D2 is electrically coupled to the first terminal of the relay and the cathode of the first diode D1. When a leakage current is detected by the first diode D1 and second diode D2 between the first input LI-L and second input LI-N, a current passes through the relay, causing the relay to close the circuit of the trip coil J1 and simultaneously disconnecting the first switch K1 and the second switch K2.

In one embodiment, the movable assembly of the leakage current detection interrupter has: (i) a trip coil frame with an opening through the center of the trip coil frame and with the electromagnetic tripping component wound on the trip coil frame, (ii) a magnetic core having a first end and an opposite, second end, with the first end positioned outside of the center opening of the trip coil frame and the second end positioned inside of the center opening of the trip coil frame, wherein the magnetic core stays in the first position when no fault condition is detected and moves to the second position when a fault condition is detected and the electromagnetic tripping component is energized, (iii) a core spring to keep the magnetic core in the first position when no fault condition is detected and the electromagnetic tripping component is not energized, (iv) a resetting component locker having a upper portion and a lower portion, wherein the lower portion is substantially perpendicular to the upper portion, the upper portion is slidably attached to the first end of the magnetic core outside of the center opening of the trip coil frame, and (v) a balance frame having a first surface, an opposite, second surface, a first side surface, an opposite, second side surface, a top surface and an opposite, bottom surface, and a body defined therebetween, a first contact support protruding from the first side surface away from the body, a second contact support protruding from the second side surface away from the body, wherein the body portion defines an opening through the center of the top surface through center of the bottom surface of the body, and a slot in proximity of the bottom surface through the first surface and the second surface of the body where the lower portion of the resetting component locker is slidably inserted, and wherein the balance frame is able to slide up and down along the openings of the movable assembly housing. When the leakage current detection interrupter is in operation, and when the resetting component is pressed, the tapered tip of the reset button pushes the resetting component locker horizontally so the resetting component locker is engaged with the notch of the resetting component and locks resetting component. The resilience of the resetting component spring pulls the balance frame and the resetting component locker upward such that the first movable contact holder and the second movable contact holder are pushed upward by the contact supports on both sides of the balance frame and causes the movable assembly in the first position. When a fault condition is detected by the leakage current detection unit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

In one embodiment, the protective shield of the first wire, the second wire and the third wire includes: (i) an insulation layer outside of the first wire, the second wire and the third wire, (ii) an outside protective insulation layer covering the first wire, the second wire and the third wire, and (iii) a filling material to fill the space between the outside protective insulation layer, and the first wire, the second wire and the third wire.

In one embodiment, the protective shield of the first wire, the second wire and the third wire further includes a weaved copper shield outside of the insulation layer of the first wire and the second wire. The weaved copper shield is electrically coupled to the second terminal of the first resistor R1.

In one embodiment, the protective shield of the first wire, the second wire and the third wire further includes a polyester conductive film outside of the weaved copper shield. The polyester conductive film is electrically coupled to the second terminal of the first resistor R1.

In one embodiment, the protective shield of the first wire, the second wire and the third wire further includes an electricity conductive wire placed inside of the weaved copper shield. The electricity conductive wire and the weaved copper shield are electrically coupled to the second terminal of the first resistor R1.

In another embodiment, the protective shield of the first wire, the second wire and the third wire further includes: (i) a polyester electricity conductive film outside of the insulation layer of the first wire and the second wire, and (ii) a conductive wire is placed inside of the polyester electricity conductive film. The electricity conductive wire and the polyester electricity conductive film are electrically coupled to the second terminal of the first resistor R1.

In another aspect, the present invention relates to a leakage current detection interrupter with fire protection means. The leakage current detection interrupter with fire protection means has: (i) a movable assembly housing which has a first side surface and an opposite, second side surface, and a body defined therebetween, and the body defines two vertical openings on the first side surface and the second surface; (ii) a first fixed contact holder having a first fixed contact point, and a second fixed contact holder having a second fixed contact point; (iii) a first movable contact holder and a second movable contact holder, each having a fixed end attached to the movable assembly housing and a movable end, where the first movable end has a first movable contact arranged for contacting the first fixed contact, the second movable end has a second movable contact arranged for contacting the second fixed contact; (iv) a movable assembly that moves between a first position in which each fixed contact makes contact with the respective movable contact and a second position in which the fixed contacts are separated from the movable contacts; (v) a resetting component having a first end accessible to a user for resetting the leakage current detection interrupter with fire protection means and a second end with a tapered tip and a notch, which, when the movable assembly is in the first position, is engaged with the movable assembly; (vi) a resetting component spring which is used to bias the resetting component so as to disengage the movable assembly; (vii) an electromagnetic tripping component, which, when energized, which is responsive to a fault condition, causes the movable assembly to be in the second position from the first position, thereby causing the resetting component to disengage the movable assembly; (viii) an leakage current protection circuit assembled on a printed circuit board for detecting the fault condition, wherein the leakage current protection circuit comprises a first input LI-L, a second input LI-N, a third input LI-G, a first out put LO-P, a second output LO-N and a third output LO-G, wherein the leakage current protection circuit is capable of detecting a fault condition and energizing the electromagnetic tripping component to cause resetting component to disengage the movable assembly in responsive to the fault condition; and (ix) a set of three electrical wires to an appliance, wherein a first wire connects the first input LI-L to the first output LO-P, a second wire connects the second input LI-N to the second output LO-N, and a third wire connects the third input LI-G to the third output LO-G of the leakage current detection interrupter with fire protection means, and wherein the first wire and the second wire are protected by a plurality of protective shields.

In one embodiment, the fault condition includes a condition when a leakage current is detected, a condition when a ground fault is detected, and a condition when the first wire, the second wire, and the third wire are damaged by fire or other physical harms.

In one embodiment, the leakage current protection circuit has (i) a first switch K1 having a first terminal connected the first input LI-L, and a second terminal connected to the first output LO-P, for opening and closing the connection between the first input LI-L and the first output LO-P, (ii) a second switch K2 having a first terminal connected the second input LI-N, and a second terminal connected to the second output LO-N, for opening and closing the connection between the second input LI-N and the second output LO-N, (iii) an trip coil J1 having a first terminal connected to the first output LO-P and a second terminal, where the trip coil J1 simultaneously controls the opening and closing of the first switch K1 and the second switch K2, (iv) a leakage current detection and fire hazard detection unit, (v) a current interrupter having a relay that has a first terminal and a second terminal, and a first resistor R1 with a first terminal and a second terminal, connected in serial such that the first terminal of the first resistor R1 is electrically coupled to the second terminal of the relay. When the leakage current detection and fire hazrd detection unit detects a fault condition, the leakage current detection and fire hazrd detection unit causes a current passing through the relay, connecting the circuit of the trip coil J1 the both input lines LI-L and LI-N to activate the trip coil J1 and causes the first switch K1 and the second switch K2 to open the circuit simultaneously, and (vi) a circuit condition indicator circuit having a light emit diode LED with an anode and a cathode and a second resistor R2 with a first terminal and a second terminal, wherein the anode of the LED is electrically coupled to the second output LO-N, the cathode of the LED is electrically coupled to the first terminal of the second resistor R2, and the second terminal of the second resistor R2 is electrically coupled to the first output LO-P, wherein when the leakage current detection interrupter with fire protection means is in normal working condition, the LED is lit, and when the leakage current detection interrupter with fire protection means detects a leakage current, the LED is off.

In one embodiment, the leakage current detection and fire hazard detection unit includes: (1) a leakage current detection unit. The leakage current detection unit has a first diode D1 and a second diode D2 each having an anode and a cathode. The anode of the first diode D1 is electrically coupled to the first input LI-L, and the cathode of the first diode D1 is electrically coupled to the first terminal of the relay. The anode of the second diode D2 is electrically coupled to the second input LI-N, and the cathode of the second diode D2 is electrically coupled to the first terminal of the relay and the cathode of the first diode D1. When a leakage current is detected by the first diode D1 and second diode D2 between the first input LI-L and second input LI-N, a current passes through the relay, causing the relay to close the circuit of the trip coil J1 and simultaneously disconnecting the first switch K1 and the second switch K2; and (2) a fire hazard detection unit. The protective shields around the first wire and second wire are connected to the second terminal of the first resistor R1. When the first wire and second wire are damaged by fire or other physical harms, the protective shields will short circuit the first output LO-P and the second output LO-N and the second terminal of the first resistor R1, causing the relay to close the circuit of the trip coil J1 and simultaneously disconnecting the first switch K1 and the second switch K2.

In one embodiment, the movable assembly of the leakage current detection interrupter with fire protection means has: (i) a trip coil frame with an opening through the center of the trip coil frame and with the electromagnetic tripping component wound on the trip coil frame, (ii) a magnetic core having a first end and an opposite, second end, with the first end positioned outside of the center opening of the trip coil frame and the second end positioned inside of the center opening of the trip coil frame, wherein the magnetic core stays in the first position when no fault condition is detected and moves to the second position when a fault condition is detected and the electromagnetic tripping component is energized, (iii) a core spring to keep the magnetic core in the first position when no fault condition is detected and the electromagnetic tripping component is not energized, (iv) a resetting component locker having a upper portion and a lower portion, wherein the lower portion is substantially perpendicular to the upper portion, the upper portion is slidably attached to the first end of the magnetic core outside of the center opening of the trip coil frame, and (v) a balance frame having a first surface, an opposite, second surface, a first side surface, an opposite, second side surface, a top surface and an opposite, bottom surface, and a body defined therebetween, a first contact support protruding from the first side surface away from the body, a second contact support protruding from the second side surface away from the body, wherein the body portion defines an opening through the center of the top surface through center of the bottom surface of the body, and a slot in proximity of the bottom surface through the first surface and the second surface of the body where the lower portion of the resetting component locker is slidably inserted, and wherein the balance frame is able to slide up and down along the openings of the movable assembly housing. When the leakage current detection interrupter with fire protection means is in operation, and when the resetting component is pressed, the tapered tip of the reset button pushes the resetting component locker horizontally so the resetting component locker is engaged with the notch of the resetting component and locks resetting component. The resilience of the resetting component spring pulls the balance frame and the resetting component locker upward such that the first movable contact holder and the second movable contact holder are pushed upward by the contact supports on both sides of the balance frame and causes the movable assembly in the first position. When a fault condition is detected by the leakage current detection unit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

In one embodiment, the protective shield of the first wire, the second wire and the third wire includes: (i) an insulation layer outside of the first wire, the second wire and the third wire, (ii) an outside protective insulation layer covering the first wire, the second wire and the third wire, and (iii) a filling material to fill the space between the outside protective insulation layer, and the first wire, the second wire and the third wire.

In one embodiment, the protective shield of the first wire, the second wire and the third wire further includes a weaved copper shield outside of the insulation layer of the first wire and the second wire. The weaved copper shield is electrically coupled to the second terminal of the first resistor R1.

In one embodiment, the protective shield of the first wire, the second wire and the third wire further includes a polyester conductive film outside of the weaved copper shield. The polyester conductive film is electrically coupled to the second terminal of the first resistor R1.

In one embodiment, the protective shield of the first wire, the second wire and the third wire further includes an electricity conductive wire placed inside of the weaved copper shield. The electricity conductive wire and the weaved copper shield are electrically coupled to the second terminal of the first resistor R1.

In another embodiment, the protective shield of the first wire, the second wire and the third wire further includes: (i) a polyester electricity conductive film outside of the insulation layer of the first wire and the second wire, and (ii) a conductive wire is placed inside of the polyester electricity conductive film. The electricity conductive wire and the polyester electricity conductive film are electrically coupled to the second terminal of the first resistor R1.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE PRESENT INVENTION

Figure 1:
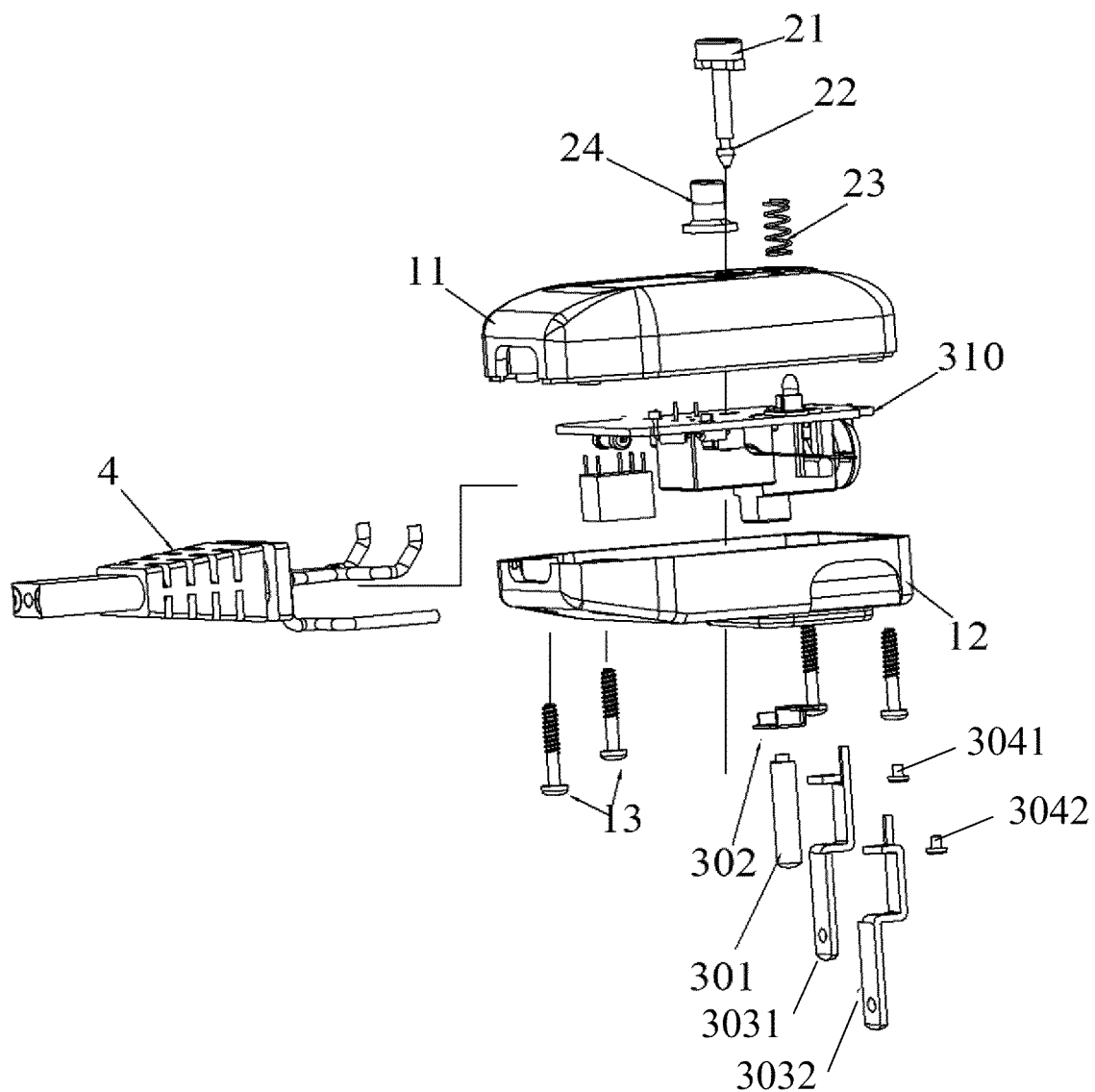
FIG. 1 shows an exemplary exploded view of a leakage current detection interrupter with fire protection means according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended. The terms "unit" and "circuit" are interchangeable.

A switching device usually can be in two states: a conductive state and a non-conductive state. When the switching device is in conductive state, a current is allowed to pass through. When the switching device is in non-conductive state, no current is allowed to pass through.

DEFINITIONS/GLOSSARY

AC: alternate current
GFCI: ground fault circuit interrupter.
LCDI: leakage current detection interrupter.
LED: light emitting diode.

SYSTEM OVERVIEW

The description will be made as to the embodiments of the present invention in conjunction with the reference to the accompanying drawings in FIGS. 1-4. In accordance with the purposes of this invention, as embodied and broadly described herein, this invention, in one aspect, relates to a leakage current detection interrupter, and in another aspect, relates to a leakage current detection interrupter with fire protection means.

In one embodiment, FIG. 1 shows an exemplary exploded view of a leakage current detection interrupter. The leakage current detection interrupter with fire protection means has: (i) a reset assembly, (ii) a printed circuit assembly 310 with a leakage current protection circuit, (iii) the body of leakage current detection interrupter with fire protection means, including a top cover 11, a bottom cover 12, an electrical wire 4 with a first wire, a second wire, and a third wire to an appliance, a set of four screws 13 to fasten the top cover 11 and the bottom cover 12, and (iii) a set of connector pins, a first connector pin 3031, a second connector pin 3032, and a third connector pin 301 for a first input LI-L, a second input LI-N, and a third input LI-G, respectively. Each connector pin has a contact point, as shown in FIG. 1. They are: a contact point 3041 for the first connector pin 3031, a contact point 3042 for the second connector pin 3032, and a contact pint 302 for the third connector pin 302.

In another embodiment, FIG. 1 shows an exemplary exploded view of a leakage current detection interrupter with fire protection means. The leakage current detection interrupter with fire protection means has: (i) a reset assembly, (ii) a printed circuit assembly 310 with a leakage current protection circuit, (iii) the body of leakage current detection interrupter with fire protection means, including a top cover 11, a bottom cover 12, an electrical wire 4 with a first wire, a second wire, and a third wire to an appliance, a set of four screws 13 to fasten the top cover 11 and the bottom cover 12, and (iv) a set of connector pins, a first fixed contact holder 3031, a second fixed contact holder 3032, and a third fixed contact holder 301 for a first input LI-L, a second input LI-N, and a third input LI-G, respectively. Each fixed contact holder has a contact point, as shown in FIG. 1. They are: a first contact point 3041 for the first fixed contact holder 3031, a second contact point 3042 for the second fixed contact holder 3032, and a third contact point 302 for the third fixed contact holder 302.

In one embodiment, the reset assembly has: (i) a resetting component 21 having a first end accessible to a user for resetting the leakage current detection interrupter and a second end with a tapered tip 22 and a notch. When a movable assembly is in a first position, the notch is engaged with the movable assembly, (ii) a resetting component spring 23 which is used to bias the resetting component 21 so as to disengage the movable assembly, and (iii) a test button 24.

Figure 2:
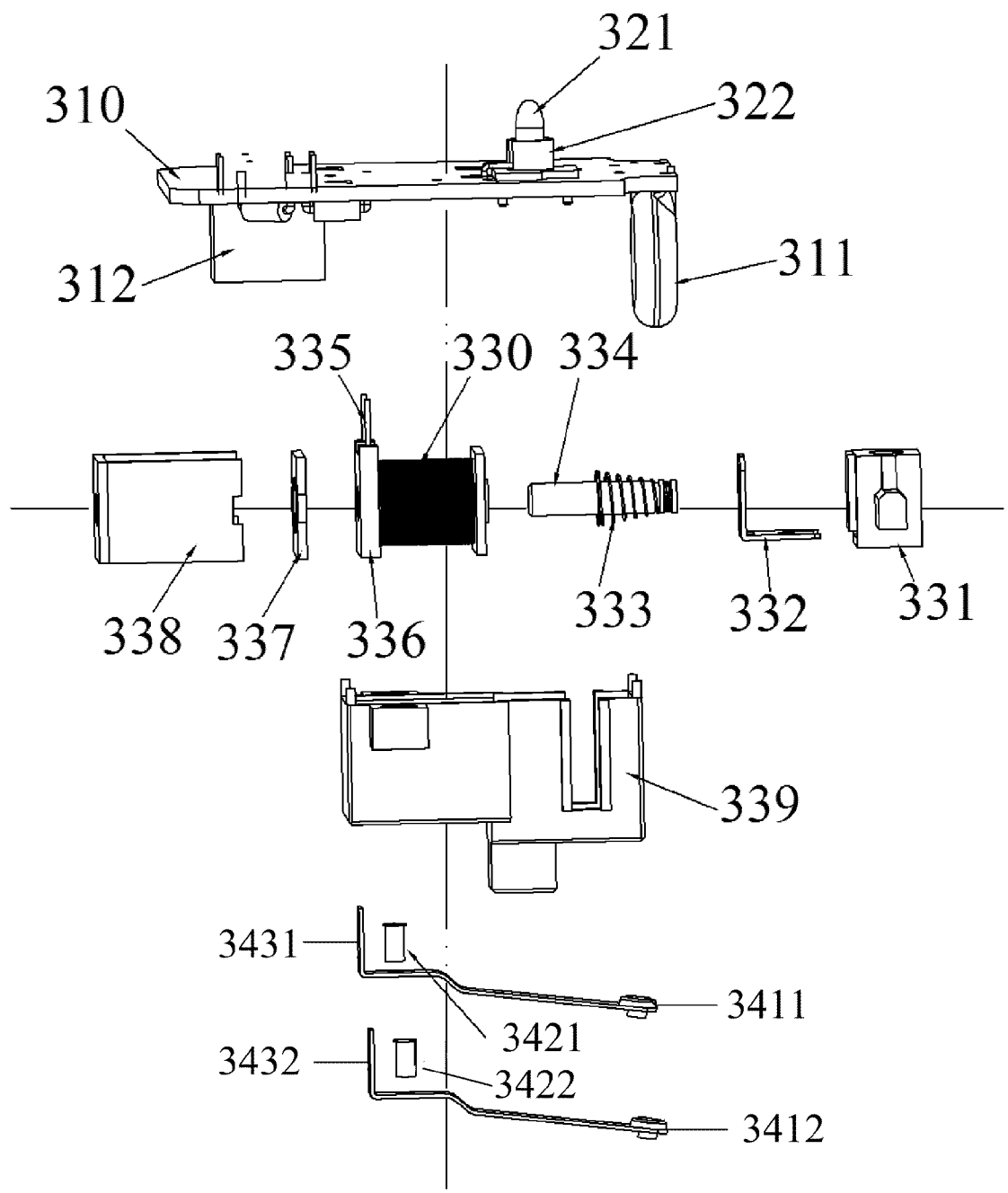
FIG. 2 shows an exploded view of more detailed key components of a leakage current detection interrupter with fire protection means according to one embodiment of the present invention.

In one embodiment, FIG. 2 shows an exploded view of more detailed key components of a leakage current detection interrupter. In another embodiment, FIG. 2 shows an exploded view of more detailed key components of a leakage current detection interrupter with fire protection means according to one embodiment of the present invention.

The more detailed key components of the leakage current detection interrupter includes: (i) a printed circuit board 310 where all components of the leakage current protection circuit are assembled, (ii) a movable assembly housing 339 having a first side surface and an opposite, second side surface, and a body defined therebetween. The body defines two vertical openings on the first side surface and the second surface, (iii) a first movable contact holder 3431 and a second movable contact holder 3432, each having a fixed end 3421 and 3422 attached to the movable assembly housing 339 and a movable end, wherein the first movable end has a first movable contact 3411 arranged for contacting the first fixed contact 3041, the second movable end has a second movable contact 3412 arranged for contacting a second fixed contact 3042, (iv) a movable assembly that moves between a first position in which each fixed contact makes contact with the respective movable contact and a second position in which the fixed contacts are separated from the movable contacts.

As shown in FIG. 2, an LED socket 322, and a circuit condition indicator LED 321 are installed on one side of the printed circuit board 310. On the other side, a relay 312, a metal oxide varister MOV 311, and the movable assembly are installed.

The movable assembly includes: (i) a trip coil frame 336 with an opening through the center of the trip coil frame 336 and with the electromagnetic tripping component 330 wound on the trip coil frame 336, and a pair of trip coil connector pins 335 electrically coupled to the printed circuit board 310; (ii) a magnetic core 334 having a first end and an opposite, second end, with the first end positioned outside of the center opening of the trip coil frame 336 and the second end positioned inside of the center opening of the trip coil frame 336, where the magnetic core 334 stays in a first position when no fault condition is detected and moves to a second position when a fault condition is detected and the electromagnetic tripping component 330 is energized; (iii) a core spring 333 to keep the magnetic core 334 in the first position when no fault condition is detected and the electromagnetic tripping component 330 is not energized; (iv) a resetting component locker 332 having a upper portion and a lower portion, where the lower portion is substantially perpendicular to the upper portion, the upper portion is slidably attached to the first end of the magnetic core 334 outside of the center opening of the trip coil frame 336; and (v) a balance frame 331 having a first surface, an opposite, second surface, a first side surface, an opposite, second side surface, a top surface and an opposite, bottom surface, and a body defined therebetween, a first contact support protruding from the first side surface away from the body, a second contact support protruding from the second side surface away from the body, wherein the body portion defines an opening through the center of the top surface through center of the bottom surface of the body, and a slot in proximity of the bottom surface through the first surface and the second surface of the body where the lower portion of the resetting component locker 332 is slidably inserted, and wherein the balance frame 331 is able to slide up and down along the openings of the movable assembly housing 339; (vi) a trip coil shied 338 and a shield block 337 covering the trip coil 330 to prevent the trip coil from magnetic interference from the outside.

ELECTRONIC STRUCTURE OF AN LCDI

Figure 3:
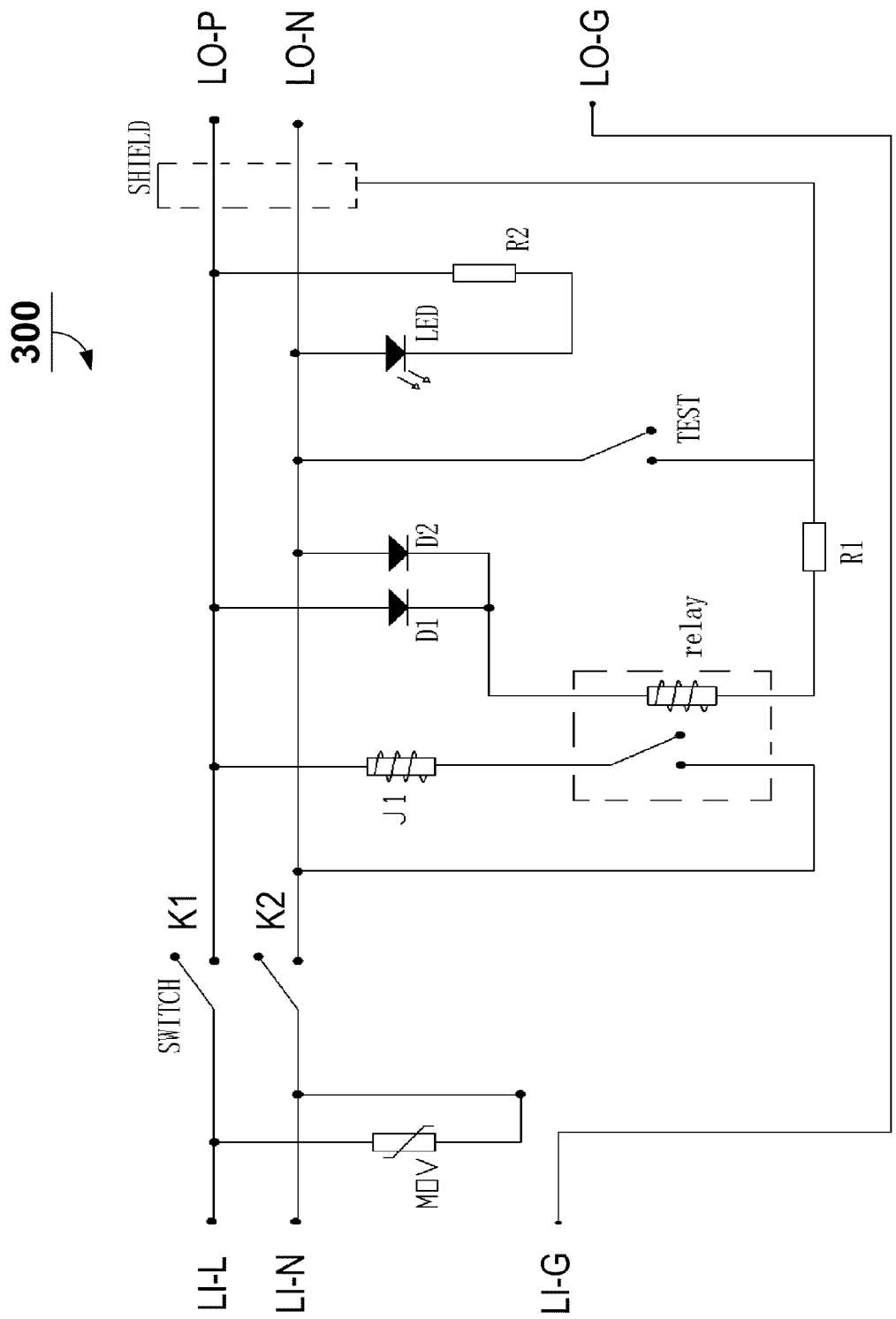
FIG. 3 is an exemplary circuit diagram of a leakage current protection circuit according to one embodiment of the present invention.

The detailed electronic circuit is depicted in the circuit diagram shown in FIG. 3 according to one embodiment of the present invention. The leakage current protection circuit 300 is capable of detecting a fault condition and energizing the electromagnetic tripping component 330 to cause resetting component 21 to disengage the movable assembly in responsive to the fault condition. In one embodiment, the fault condition includes a condition when a leakage current is detected, and a condition when a ground fault is detected. In another embodiment, the fault condition includes a condition when a leakage current is detected, a condition when a ground fault is detected, and a condition when the first wire, the second wire, and the third wire are damaged by fire or other physical harms.

As shown in FIG. 3, the leakage current protection circuit 300 includes:
  a first switch K1 having a first terminal connected the first input LI-L, and a second terminal connected to the first output LO-P, for opening and closing the connection between the first input LI-l and the first output LO-P;

a second switch K2 having a first terminal connected the first input LI-N, and a second terminal connected to the first output LO-N, for opening and closing the connection between the first input LI-N and the first output LO-N;

a third input LI-G is directly connected to the third output LO-G;

an trip coil J1 having a first terminal connected to the first input LI-P and a second terminal, where the trip coil J1 simultaneously controls the opening and closing of the first switch K1 and the second switch K2;

a metal oxide varister MOV 311 with a first terminal electrically couple to the first input LI-L, and a second terminal electrically coupled to the second input LI-N;

a relay 312 having a first terminal and a second terminal, when electric current passes through the relay 312, the connectors inside the relay will close causing the trip coil J1 (330) to be energized, so that the switches K1, and K2 are open to disconnect the electricity from the first input LI-L to the first output LO-P, and from the second input LI-N to the second output LO-N;

a leakage current detection unit containing (i) a first diode D1 having an anode and a cathode, wherein the anode is electrically coupled to the first input LI-L, and the cathode is electrically coupled to the first terminal of the relay, (ii) a second diode D2 having an anode and a cathode, wherein the anode is electrically coupled to the second input LI-N, and the cathode is electrically coupled to the first terminal of the relay and the cathode of the first diode D1, wherein when a leakage current is detected by the first diode D1 and second diode D2 between the first input LI-L and second input LI-N, a current passes through the relay 312, causing the relay to energize the circuit of the trip coil J1 and simultaneously disconnecting the first switch K1 and the second switch K2, and (iii) a current limiting first resistor R1;

a testing circuit TEST, when a user presses the test button 24, the two ends of the TEST are electrically connected to cause a current passing through the relay to connect the trip coil J1 to the two the first input LI-L and second input LI-N—the trip coil J1 is energized, so that the switches K1, and K2 are open to disconnect the electricity from the first input LI-L to the first output LO-P, and from the second input LI-N to the second output LO-N;

a circuit condition indicator circuit having a light emit diode LED 321 with an anode and a cathode and a second resistor R2 with a first terminal and a second terminal, wherein the anode of the LED is electrically coupled to the second output LO-N, the cathode of the LED is electrically coupled to the first terminal of the second resistor R2, and the second terminal of the second resistor R2 is electrically coupled to the first output LO-P, when the leakage current detection interrupter is in normal working condition, the LED is turned on, and when the leakage current detection interrupter detects a leakage current, the LED is turned off; and a plurality of protective shields covering the first wire between the first input LI-L and the first output LO-P, the second wire between the second input LI-N and the second output LO-N, and the third wire between the third input LI-G and the third output LO-G, wherein the plurality of the protective shields are electrically connected to the second terminal of the first resistor R1, such that, when at least one of the first wire, the second wire and the third wire is damaged by fire or other physical harms, when the wires are short circuited due to the damages to the wires, the leakage current detected by the shields will be connected to the leakage current detection circuit, causing a current to pass through the relay to connect the trip coil J1 to the two the first input LI-L and second input LI-N—the trip coil J1 is energized, so that the switches K1, and K2 are open to disconnect the electricity from the first input LI-L to the first output LO-P, and from the second input LI-N to the second output LO-N;

MECHANICAL STRUCTURE OF AN LCDI

Referring now to FIGS. 1 and 2, an exploded view of an LCDI with Fire Protection Means is shown according to one embodiment of the present invention. Mechanically, the LCDI, includes:

a upper casing 11, a lower casing 12, a wire connector 317 having three shielded wires connecting to the three wires of the Source of electricity and four fastening screws 13 to attach the upper casing and the lower casing;

three prongs (one for phase wire 3031, one for neutral wire 3032 and one for ground 301) for connecting a source of electricity from a wall outlet, the prongs 3031 and 3032 having a stationary contact 3041 and 3042 respectively for connecting to a set of movable contact points and the prong 301 having a metal contact 302 for connecting the ground;

a resetting component 21 with a notch and a tapered end 22, and a resetting component spring 23;

a test button 24, being able to make two test contacts on the circuit board 310 contact to each other, when pressed; and a printed circuit board 310, a plurality of electronic components installed on the printed circuit board 310, and a trip mechanism.

The resetting component 21 has a first end accessible to a user for resetting the leakage current detection interrupter and a second end with a tapered tip 22 and a notch. When the movable assembly is in the first position, the resetting component 21 is engaged with the movable assembly. When the movable assembly is in the second position, the resetting component spring 23 releases the resetting component 21 and disengages the movable assembly. The electromagnetic tripping component 330, when energized in responsive to a fault condition, causes the movable assembly to be in the second position from the first position, and therefore causing the resetting component 21 to disengage the movable assembly.

The trip mechanism includes: (i) a movable assembly housing 339, (ii) a first fixed contact holder 3031 and a second fixed contact holder 3032, (iii) a first movable contact holder 3431 and a second movable contact holder 3432, (iv) a movable assembly, (v) an electromagnetic tripping component 330, (vi) an leakage current protection circuit 300.

The movable assembly housing 339 has a first side surface and an opposite, second side surface, and a body defined therebetween. The body of movable assembly housing 313 defines two vertical openings on the first side surface and the second surface. The first fixed contact holder 3031 has a first fixed contact point 3041 and the second fixed contact holder 3032 has a second fixed contact point 3042. Each of the first movable contact holder 3031 and the second movable contact holder 3032 has a fixed end attached to the movable assembly housing 339 and a movable end. The first movable end has a first movable contact point 3411 arranged for contacting the second fixed contact point 3042 and the second movable end has a second movable contact point 3412 arranged for contacting the first fixed contact point 3042. The movable assembly moves between a first position in which each fixed contact point makes contact with the respective movable contact point and a second position in which the fixed contacts are separated from the respective movable contact points.

The movable assembly has: (i) a trip coil frame 336 with an opening through the center of the trip coil frame 336 and with the electromagnetic tripping component 330 wound on the trip coil frame 336, (ii) a magnetic core 334 having a first end and an opposite, second end, with the first end positioned outside of the center opening of the trip coil frame 336 and the second end positioned inside of the center opening of the trip coil frame 336, (iii) a core spring 333 to keep the magnetic core 334 in the first position when no fault condition is detected and the electromagnetic tripping component 330 is not energized, (vi) a resetting component locker 332 having a upper portion and a lower portion, and (v) a balance frame 331.

The magnetic core 334 stays in the first position when no fault condition is detected and moves to the second position when a fault condition is detected and the electromagnetic tripping component 316 is energized. In one embodiment, the fault condition includes a condition when a leakage current is detected, and a condition when a ground fault is detected. In another embodiment, the fault condition includes a condition when a leakage current is detected, a condition when a ground fault is detected, and a condition when the first wire, the second wire, and the third wire are damaged by fire or other physical harms.

The lower portion of the resetting component locker 332 is substantially perpendicular to the upper portion. The upper portion of the resetting component locker 332 is slidably attached to the first end of the magnetic core 334 outside of the center opening of the trip coil frame 336. The balance frame 331 has a first surface, an opposite, second surface, a first side surface, an opposite, second side surface, a top surface and an opposite, bottom surface, and a body portion defined therebetween, a first contact support protruding from the first side surface away from the body portion, a second contact support protruding from the second side surface away from the body portion. The body portion defines an opening through the center of the top surface through center of the bottom surface of the body portion, and a slot in proximity of the bottom surface through the first surface and the second surface of the body portion where the lower portion of the resetting component locker 332 is slidably inserted. The balance frame 331 is able to slide up and down along the two vertical openings of the movable assembly housing 339.

When the resetting component 21 is pressed, the notch of the resetting component 21 pushes the resetting component locker 332 horizontally so the resetting component locker 332 is engaged with the notch of the resetting component 21 and locks resetting component 21, and the resilience of the resetting component spring 333 pulls the balance frame 331 and the resetting component locker 332 upward such that the first movable contact point 3411 and the second movable contact point 3412 are pushed upward by the contact supports on both sides of the balance frame 331 and causes the movable assembly to be in the first position. When a fault condition is detected by the leakage current protection circuit 300, a current is directed to the electromagnetic tripping component 330 causing an electromagnetic force to pull the magnetic core 334 towards the trip coil frame 336, along with the resetting component locker 332, such that the resetting component locker 332 is released from the engagement with the resetting component 21, and the balance frame 331 together with the resetting component locker 332 moves downward at the action of the resilience force of the first movable contact holder 3431 and the second movable contact holder 3432 to set the movable assembly in the second position.

When the LCDI is in a Normal Working Condition: After the resetting component 21 is pressed, the notch of the resetting component 21 pushes the resetting component locker 332 horizontally so the resetting component locker 332 is engaged with the notch of the resetting component 21 and locks resetting component 21. Due to the resilience of the resetting component spring 333, the balance frame 331 and the resetting component locker 332 are pulled upward. This upward movement brings the first movable contact holder 3431 and the second movable contact holder 3432 upward by the first contact support and the second contact support of the balance frame 331. Therefore the input source of electricity is connected through two pairs of contact points, respectively, and the ground prong 301 to the output wires connector.

When the LCDI is in a Trip Condition: When leakage current is detected by the LCDI, or fire hazard occurs, a current passes through the electromagnetic tripping component 330. The current pulls the magnetic core 334 away from the resetting component 21, along with the resetting component locker 332. This movement disengages the resetting component locker 332 from the resetting component 21. The resetting component 21 moves upward through the resilience of the resetting component spring 23. On the other hand, the balance frame 331 together with the resetting component locker 332 moves downward at the action of the resilience of the pair of movable contact 3431 and 3432. This downward movement disconnects the source of electricity from at least one user accessible load.

FIGS. 4A-4D illustrate cross-sectional views of exemplary sets of three electrical wires to appliances, according to one embodiment of the present invention.

Figure 4A:
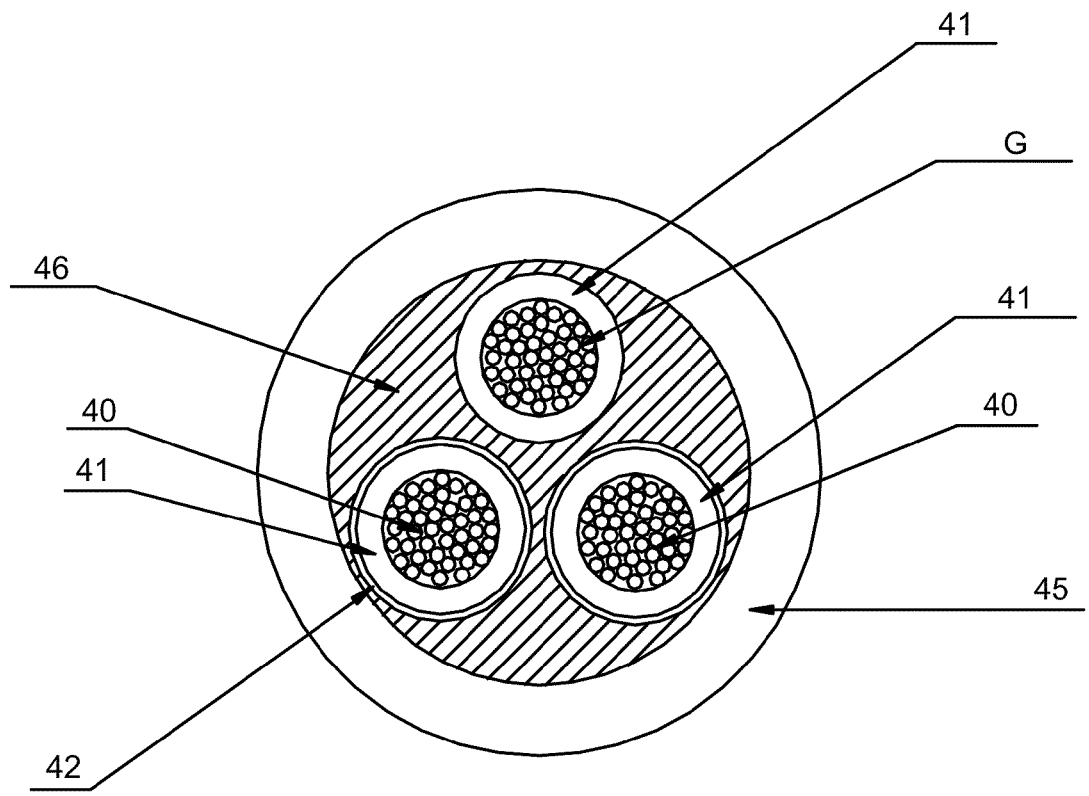
FIGS. 4A-4D illustrate cross-sectional views of exemplary sets of three electrical wires to appliances, according to one embodiment of the present invention.

In one embodiment, a cross-sectional view of an exemplary set of three electrical wires to appliance is shown in FIG. 4A. In this embodiment, the phase wire 40 connecting to the first input LI-L, the neutral wire 40 connecting to the second input LI-N, and the ground wire G connecting to the third input LI-G are first covered with a insulation layer 41. The phase wire and the neutral wire are further covered with a layer of weaved copper shield 42. Then, all three wires are covered by an external insulation layer 45. The space inside of the external insulation layer 45, and between the three covered wires, is filled with filler materials 46. The weaved copper shield 42 is electrically coupled to the second terminal of the first resistor R1.

Figure 4B:
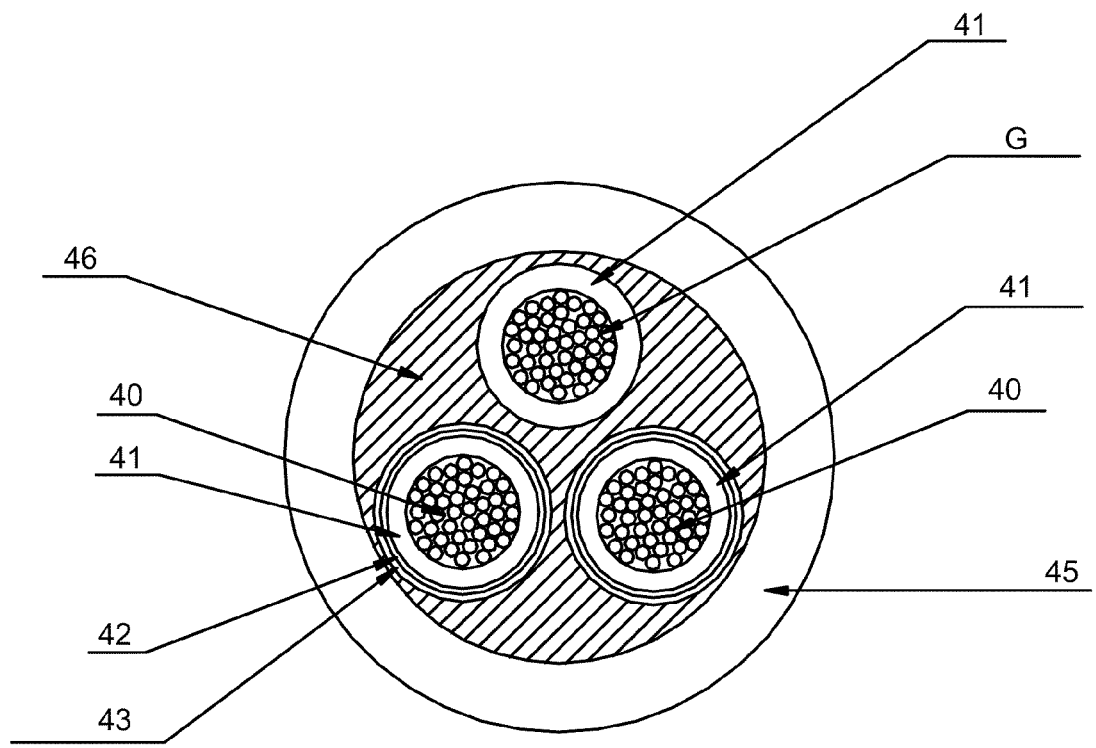

In another embodiment, a cross-sectional view of an exemplary set of three electrical wires to appliance is shown in FIG. 4B. In this embodiment, the phase wire 40 connecting to the first input LI-L, the neutral wire 40 connecting to the second input LI-N, and the ground wire G connecting to the third input LI-G are first covered with a insulation layer 41. The phase wire and the neutral wire are further covered with a layer of weaved copper shield 42, and a polyester conductive film 43 outside of the weaved copper shield 42. Then, all three wires are covered by an external insulation layer 45. The space inside of the external insulation layer 45, and between the three covered wires, is filled with filler materials 46. The weaved copper shield 42 and the polyester conductive film 43 outside of the weaved copper shield 42 are both electrically coupled to the second terminal of the first resistor R1.

Figure 4C:
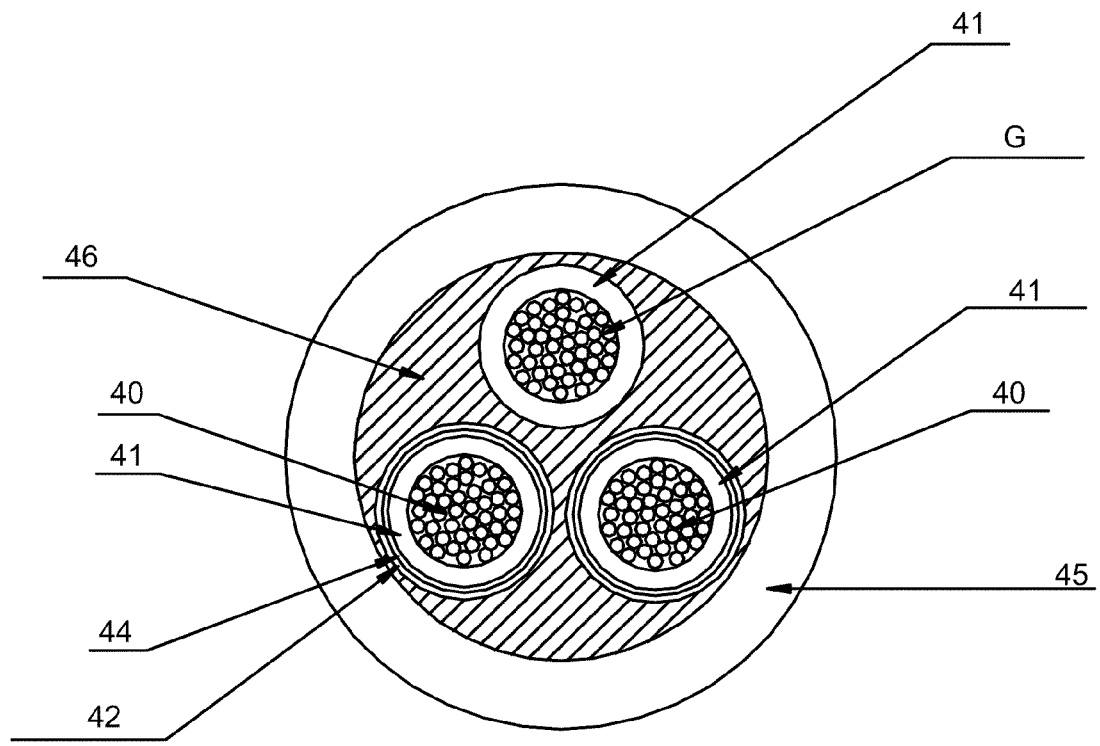

In yet another embodiment, a cross-sectional view of an exemplary set of three electrical wires to appliance is shown in FIG. 4C. In this embodiment, the phase wire 40 connecting to the first input LI-L, the neutral wire 40 connecting to the second input LI-N, and the ground wire G connecting to the third input LI-G are first covered with a insulation layer 41.

The phase wire and the neutral wire are further covered with a polyester conductive film 43 outside of the weaved copper shield 42, and an electricity conductive wire 44 is placed inside of the weaved copper shield 42. Then, all three wires are covered by an external insulation layer 45. The space inside of the external insulation layer 45, and between the three covered wires, is filled with filler materials 46. The weaved copper shield 42 and the electricity conductive wire 44 inside of the weaved copper shield 42 are both electrically coupled to the second terminal of the first resistor R1.

Figure 4D:
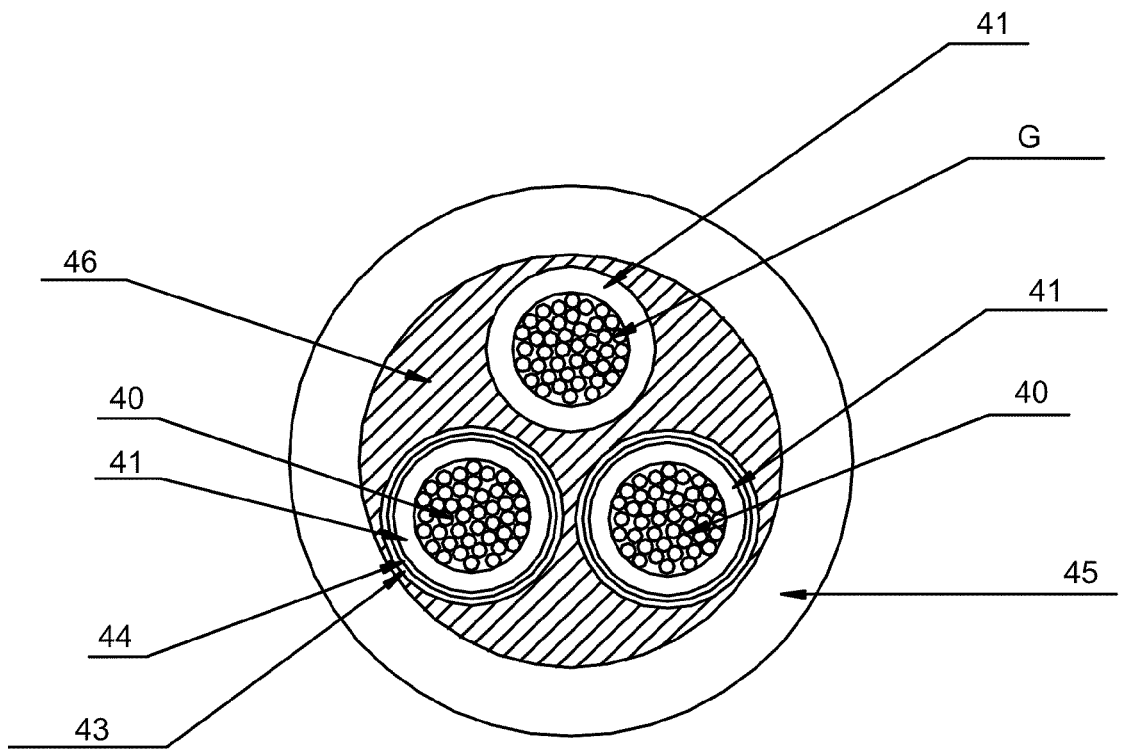

In a further embodiment, a cross-sectional view of an exemplary set of three electrical wires to appliance is shown in FIG. 4D. In this embodiment, the phase wire 40 connecting to the first input LI-L, the neutral wire 40 connecting to the second input LI-N, and the ground wire G connecting to the third input LI-G are first covered with a insulation layer 41. The phase wire and the neutral wire are further covered with a layer of polyester conductive film 43, and an electricity conductive wire 44 is placed inside of the polyester conductive film 43. Then, all three wires are covered by an external insulation layer 45. The space inside of the external insulation layer 45, and between the three covered wires, is filled with filler materials 46. The polyester conductive film 43 and the electricity conductive wire 44 inside of the polyester conductive film 43 are both electrically coupled to the second terminal of the first resistor R1.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A leakage current detection interrupter, comprising:
(I) a movable assembly housing having a first side surface and an opposite, second side surface, and a body defined therebetween, wherein the body defines two vertical openings on the first side surface and the second surface;
(II) a first fixed contact holder having a first fixed contact point, and a second fixed contact holder having a second fixed contact point;
(III) a first movable contact holder and a second movable contact holder, each having a fixed end attached to the movable assembly housing and a movable end, wherein the first movable end has a first movable contact arranged for contacting the first fixed contact, the second movable end has a second movable contact arranged for contacting the second fixed contact;
(IV) a movable assembly that moves between a first position in which each fixed contact makes contact with the respective movable contact and a second position in which the fixed contacts are separated from the movable contacts;
(V) a resetting component having a first end accessible to a user for resetting the leakage current detection interrupter and a second end with a tapered tip and a notch, which, when the movable assembly is in the first position, is engaged with the movable assembly;
(VI) a resetting component spring which is used to bias the resetting component;
(VII) an electromagnetic tripping component, which, when energized, which is responsive to a fault condition, causes the movable assembly to be in the second position from the first position, thereby causing the resetting component to disengage the movable assembly, wherein the fault condition comprises a condition when a leakage current is detected, and a condition when a ground fault is detected;
(VIII) an leakage current protection circuit assembled on a printed circuit board for detecting the fault condition, wherein the leakage current protection circuit comprises a first input LI-L, a second input LI-N, a third input LI-G, a first out put LO-P, a second output LO-N and a third output LO-G, wherein the leakage current protection circuit is capable of detecting a fault condition and energizing the electromagnetic tripping component to cause resetting component to disengage the movable assembly in responsive to the fault condition;
(IX) a set of three electrical wires to an appliance, wherein a first wire connects the first input LI-L to the first output LO-P, a second wire connects the second input LI-N to the second output LO-N, and a third wire connects the third input LI-G to the third output LO-G of the leakage current detection interrupter, and wherein the first wire and the second wire are protected by a plurality of protective shields;
(X) a first switch K1 having a first terminal connected the first input LI-L, and a second terminal connected to the first output LO-P, for opening and closing the connection between the first input LI-L and the first output LO-P;
(XI) a second switch K2 having a first terminal connected the second input LI-N, and a second terminal connected to the second output LO-N, for opening and closing the connection between the second input LI-N and the second output LO-N;
(XII) an trip coil J1 having a first terminal connected to the first output LO-P and a second terminal, where the trip coil J1 simultaneously controls the opening and closing of the first switch K1 and the second switch K2;
(XIII) a leakage current detection unit having a metal oxide varister MOV with a first terminal and a second terminal, wherein the first terminal of the MOV is electrically coupled to the first input LI-I and the second terminal of the MOV is electrically coupled to the second input LI-N;
(XIV) a current interrupter having a relay having a first terminal and a second terminal, and a first resistor R1 having a first terminal and a second terminal, connected in serial such that the first terminal of the first resistor R1 is electrically coupled to the second terminal of the relay, wherein the leakage current detection unit detects a fault condition, causing a current passing through the relay, which connects the circuit of the trip coil J1 the both input lines LI-L and LI-N to activate the trip coil J1 and causes the first switch K1 and the second switch K2 to open the circuit simultaneously; and
(XV) a circuit condition indicator circuit having a light emit diode LED with an anode and a cathode and a second resistor R2 with a first terminal and a second terminal, wherein the anode of the LED is electrically coupled to the second output LO-N, the cathode of the LED is electrically coupled to the first terminal of the second resistor R2, and the second terminal of the second resistor R2 is electrically coupled to the first output LO-P, wherein when the leakage current detection interrupter is in normal working condition, the LED is lit, and when the leakage current detection interrupter detects a leakage current, the LED is off,
wherein the leakage current detection unit comprises a first diode D1 having an anode and a cathode, wherein the anode is electrically coupled to the first input LI-L, and the cathode is electrically coupled to the first terminal of the relay, and a second diode D2 having an anode and a cathode, wherein the anode is electrically coupled to the second input LI-N, and the cathode is electrically coupled to the first terminal of the relay and the cathode of the first diode D1, wherein when a leakage current is detected by the first diode D1 and second diode D2 between the first input LI-L and second input LI-N, a current passes through the relay, causing the relay to close the circuit of the trip coil J1 and simultaneously disconnecting the first switch K1 and the second switch K2.

2. The leakage current detection interrupter of claim 1, wherein the movable assembly comprises:
  (i) a trip coil frame with an opening through the center of the trip coil frame and with the electromagnetic tripping component wound on the trip coil frame;
  (ii) a magnetic core having a first end and an opposite, second end, with the first end positioned outside of the center opening of the trip coil frame and the second end positioned inside of the center opening of the trip coil frame, wherein the magnetic core stays in the first position when no fault condition is detected and moves to the second position when a fault condition is detected and the electromagnetic tripping component is energized;
  (iii) a core spring to keep the magnetic core in the first position when no fault condition is detected and the electromagnetic tripping component is not energized;
  (iv) a resetting component locker having a upper portion and a lower portion, wherein the lower portion is substantially perpendicular to the upper portion, the upper portion is slidably attached to the first end of the magnetic core outside of the center opening of the trip coil frame; and
  (v) a balance frame having a first surface, an opposite, second surface, a first side surface, an opposite, second side surface, a top surface and an opposite, bottom surface, and a body defined therebetween, a first contact support protruding from the first side surface away from the body, a second contact support protruding from the second side surface away from the body, wherein the body portion defines an opening through the center of the top surface through center of the bottom surface of the body, and a slot in proximity of the bottom surface through the first surface and the second surface of the body where the lower portion of the resetting component locker is slidably inserted, and wherein the balance frame is able to slide up and down along the openings of the movable assembly housing,
wherein in operation, when the resetting component is pressed, the tapered tip of the reset button pushes the resetting component locker horizontally so the resetting component locker is engaged with the notch of the resetting component and locks resetting component, and the resilience of the resetting component spring pulls the balance frame and the resetting component locker upward such that the first movable contact holder and the second movable contact holder are pushed upward by the contact supports on both sides of the balance frame and causes the movable assembly in the first position, and when a fault condition is detected by the leakage current detection unit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

3. The leakage current detection interrupter of claim 2, wherein the protective shield of the first wire, the second wire and the third wire comprises:
  (i) an insulation layer outside of the first wire, the second wire and the third wire;
  (ii) an outside protective insulation layer covering the first wire, the second wire and the third wire; and
  (iii) a filling material to fill the space between the outside protective insulation layer, and the first wire, the second wire and the third wire.

4. The leakage current detection interrupter of claim 3, wherein the protective shield of the first wire, the second wire and the third wire further comprises a weaved copper shield outside of the insulation layer of the first wire and the second wire, wherein the weaved copper shield is electrically coupled to the second terminal of the first resistor R1.

5. The leakage current detection interrupter of claim 4, wherein the protective shield of the first wire, the second wire and the third wire further comprises a polyester conductive film outside of the weaved copper shield, wherein the polyester conductive film is electrically coupled to the second terminal of the first resistor R1.

6. The leakage current detection interrupter of claim 4, wherein the protective shield of the first wire, the second wire and the third wire further comprises an electricity conductive wire placed inside of the weaved copper shield, wherein the electricity conductive wire and the weaved copper shield are electrically coupled to the second terminal of the first resistor R1.

7. The leakage current detection interrupter of claim 3, wherein the protective shield of the first wire, the second wire and the third wire further comprises:
  (i) a polyester electricity conductive film outside of the insulation layer of the first wire and the second wire; and
  (ii) a conductive wire is placed inside of the polyester electricity conductive film, wherein the electricity conductive wire and the polyester electricity conductive film are electrically coupled to the second terminal of the first resistor R1.

8. A leakage current detection interrupter with fire protection means, comprising:
  (I) a movable assembly housing having a first side surface and an opposite, second side surface, and a body defined therebetween, wherein the body defines two vertical openings on the first side surface and the second surface;
  (II) a first fixed contact holder having a first fixed contact point, and a second fixed contact holder having a second fixed contact point;
  (III) a first movable contact holder and a second movable contact holder, each having a fixed end attached to the movable assembly housing and a movable end, wherein the first movable end has a first movable contact arranged for contacting the first fixed contact, the second movable end has a second movable contact arranged for contacting the second fixed contact;

(IV) a movable assembly that moves between a first position in which each fixed contact makes contact with the respective movable contact and a second position in which the fixed contacts are separated from the movable contacts;
(V) a resetting component having a first end accessible to a user for resetting the leakage current detection interrupter with fire protection means and a second end with a tapered tip and a notch, which, when the movable assembly is in the first position, is engaged with the movable assembly;
(VI) a resetting component spring which is used to bias the resetting component;
(VII) an electromagnetic tripping component, which, when energized, which is responsive to a fault condition, causes the movable assembly to be in the second position from the first position, thereby causing the resetting component to disengage the movable assembly, wherein the fault condition comprises a condition when a leakage current is detected, a condition when a ground fault is detected, and a condition when the first wire, the second wire, and the third wire are damaged by fire;
(VIII) an leakage current protection circuit assembled on a printed circuit board for detecting the fault condition, wherein the leakage current protection circuit comprises a first input LI-L, a second input LI-N, a third input LI-G, a first out put LO-P, a second output LO-N and a third output LO-G, wherein the leakage current protection circuit 300 is capable of detecting a fault condition and energizing the electromagnetic tripping component to cause resetting component to disengage the movable assembly in responsive to the fault condition;
(IX) a set of three electrical wires to an appliance, wherein a first wire connects the first input LI-L to the first output LO-P, a second wire connects the second input LI-N to the second output LO-N, and a third wire connects the third input LI-G to the third output LO-G of the leakage current detection interrupter, and wherein the first wire and the second wire are protected by a plurality of protective shields;
(X) a first switch K1 having a first terminal connected the first input LI-L, and a second terminal connected to the first output LO-P, for opening and closing the connection between the first input LI-L and the first output LO-P;
(XI) a second switch K2 having a first terminal connected the second input LI-N, and a second terminal connected to the second output LO-N, for opening and closing the connection between the second input LI-N and the second output LO-N;
(XII) an trip coil J1 having a first terminal connected to the first output LO-P and a second terminal, where the trip coil J1 simultaneously controls the opening and closing of the first switch K1 and the second switch K2;
(XIII) a leakage current detection and fire hazard detection unit having a metal oxide varister MOV with a first terminal and a second terminal, wherein the first terminal of the MOV is electrically coupled to the first input LI-I and the second terminal of the MOV is electrically coupled to the second input LI-N;
(XIV) a current interrupter having a relay having a first terminal and a second terminal, and a first resistor R1 having a first terminal and a second terminal, connected in serial such that the first terminal of the first resistor R1 is electrically coupled to the second terminal of the relay, wherein the leakage current detection and fire hazard detection unit detects a fault condition, causing a current passing through the relay, which connects the circuit of the trip coil J1 the both input lines LI-L and LI-N to activate the trip coil J1 and causes the first switch K1 and the second switch K2 to open the circuit simultaneously; and
(XV) a circuit condition indicator circuit having a light emit diode LED with an anode and a cathode and a second resistor R2 with a first terminal and a second terminal wherein the anode of the LED is electrically coupled to the second output LO-N, the cathode of the LED is electrically coupled to the first terminal of the second resistor R2, and the second terminal of the second resistor R2 is electrically coupled to the first output LO-P, wherein when the leakage current detection interrupter with fire protection means is in normal working condition, the LED is lit, and when the leakage current detection interrupter with fire protection means detects a leakage current or a fire hazard, the LED is off,
wherein the leakage current detection and fire hazard detection unit comprises:
(i) a leakage current detection unit having a first diode D1 having an anode and a cathode, wherein the anode is electrically coupled to the first input LI-L, and the cathode is electrically coupled to the first terminal of the relay, and a second diode D2 having an anode and a cathode, wherein the anode is electrically coupled to the second input LI-N, and the cathode is electrically coupled to the first terminal of the relay and the cathode of the first diode D1, wherein when a leakage current is detected by the first diode D1 and second diode D2 between the first input LI-L and second input LI-N, a current passes through the relay, causing the relay to close the circuit of the trip coil J1 and simultaneously disconnecting the first switch K1 and the second switch K2; and
(ii) a fire hazard detection unit, wherein the shields around the first wire and second wire are connected to the second terminal of the first resistor R1, wherein when the first wire and second wire are damaged by fire, the protective shields will short circuit the first output LO-P and the second output LO-N and the second terminal of the first resistor R1, causing the relay to close the circuit of the trip coil J1 and simultaneously disconnecting the first switch K1 and the second switch K2.

9. The leakage current detection interrupter with fire protection means of claim 8, wherein the movable assembly comprises:
(i) a trip coil frame with an opening through the center of the trip coil frame and with the electromagnetic tripping component wound on the trip coil frame;
(ii) a magnetic core having a first end and an opposite, second end, with the first end positioned outside of the center opening of the trip coil frame and the second end positioned inside of the center opening of the trip coil frame, wherein the magnetic core stays in the first position when no fault condition is detected and moves to the second position when a fault condition is detected and the electromagnetic tripping component is energized;
(iii) a core spring to keep the magnetic core in the first position when no fault condition is detected and the electromagnetic tripping component is not energized;
(iv) a resetting component locker having a upper portion and a lower portion, wherein the lower portion is substantially perpendicular to the upper portion, the upper portion is slidably attached to the first end of the magnetic core outside of the center opening of the trip coil frame; and (v) a balance frame having a first surface, an opposite, second surface, a first side surface, an opposite, second side surface, a top surface and an opposite, bottom surface, and a body defined therebetween, a first contact support protruding from the first side surface away from the body, a second contact support protruding from the second side surface away from the body, wherein the body portion defines an opening through the center of the top surface through center of the bottom surface of the body, and a slot in proximity of the bottom surface through the first surface and the second surface of the body where the lower portion of the resetting component locker is slidably inserted, and wherein the balance frame is able to slide up and down along the openings of the movable assembly housing;

wherein in operation, when the resetting component is pressed, the tapered tip of the reset button pushes the resetting component locker horizontally so the resetting component locker is engaged with the notch of the resetting component and locks resetting component, and the resilience of the resetting component spring pulls the balance frame and the resetting component locker upward such that the first movable contact holder and the second movable contact holder are pushed upward by the contact supports on both sides of the balance frame and causes the movable assembly in the first position, and when a fault condition is detected by the leakage current detection and fire hazard detection unit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

10. The leakage current detection interrupter with fire protection means of claim 9, wherein the protective shield of the first wire, the second wire and the third wire comprises:

(i) an insulation layer outside of the first wire, the second wire and the third wire;
(ii) an outside protective insulation layer covering the first wire, the second wire and the third wire; and
(iii) a filling material to fill the space between the outside protective insulation layer, and the first wire, the second wire and the third wire.

11. The leakage current detection interrupter with fire protection means of claim 10, wherein the protective shield of the first wire, the second wire and the third wire further comprises a weaved copper shield outside of the insulation layer of the first wire and the second wire, wherein the weaved copper shield is electrically coupled to the second terminal of the first resistor R1.

12. The leakage current detection interrupter with fire protection means of claim 11, wherein the protective shield of the first wire, the second wire and the third wire further comprises a polyester conductive film outside of the weaved copper shield, wherein the polyester conductive film is electrically coupled to the second terminal of the first resistor R1.

13. The leakage current detection interrupter with fire protection means of claim 11, wherein the protective shield of the first wire, the second wire and the third wire further comprises an electricity conductive wire placed inside of the weaved copper shield, wherein the electricity conductive wire and the weaved copper shield are electrically coupled to the second terminal of the first resistor R1.

14. The leakage current detection interrupter with fire protection means of claim 10, wherein the protective shield of the first wire, the second wire and the third wire further comprises:

(i) a polyester electricity conductive film outside of the insulation layer of the first wire and the second wire; and
(ii) a conductive wire is placed inside of the polyester electricity conductive film, wherein the electricity conductive wire and the polyester electricity conductive film are electrically coupled to the second terminal of the first resistor R1.

* * * * *